United States Patent [19]

Bosso et al.

[11] Patent Number: 4,501,833

[45] Date of Patent: Feb. 26, 1985

[54] LOW TEMPERATURE AMINOPLAST CURABLE CATIONIC ELECTRODEPOSITABLE COATING COMPOSITIONS

[75] Inventors: Joseph F. Bosso, Lower Burrell; William J. Geiger, New Kensington, both of Pa.

[73] Assignee: PPG Industries, Inc., Pittsburgh, Pa.

[21] Appl. No.: 495,306

[22] Filed: May 16, 1983

[51] Int. Cl.³ ............................................. C08L 63/00
[52] U.S. Cl. ................................ 523/416; 204/181 C; 524/901; 525/510; 525/523
[58] Field of Search ................ 524/901; 525/510, 523; 523/416; 204/181 C

[56] References Cited

U.S. PATENT DOCUMENTS

| | | | |
|---|---|---|---|
| 3,454,482 | 7/1969 | Spoor et al. | 204/181 |
| 3,663,389 | 5/1972 | Koral et al. | 524/502 |
| 3,839,252 | 10/1974 | Bosso et al. | 260/29.2 EP |
| 3,937,679 | 2/1976 | Bosso et al. | 524/901 |
| 4,038,166 | 7/1977 | Bosso et al. | 204/181 |

OTHER PUBLICATIONS

Trade Literature from Monsanto Company, RESIMENE 717.
Pp. 63–66 from "Melamine & Melamine Type Resins".

Primary Examiner—Theodore E. Pertilla
Attorney, Agent, or Firm—William J. Uhl

[57] ABSTRACT

Aminoplast curable cationic coating compositions are disclosed. The coating compositions contain an onium salt group-containing polymer and an aminoplast curing agent which has at least one group of the structure:

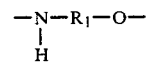

wherein $R_1$ is carbon derived from an aldehyde or a ketone.

16 Claims, No Drawings

LOW TEMPERATURE AMINOPLAST CURABLE CATIONIC ELECTRODEPOSITABLE COATING COMPOSITIONS

BACKGROUND OF THE INVENTION

1. Field of the Invention

The present invention relates to cationic coating compositions, more particularly, to cationic coating compositions containing an onium group-containing polymer in combination with an aminoplast curing agent, and to the use of these compositions in cationic electrodeposition.

2. Brief Description of the Prior Art

Electrodeposition is a coating application method which involves the deposition of a film-forming composition under the influence of an applied electrical potential. Electrodeposition has become increasingly important in the coatings industry because by comparison with non-electrophoretic coating means, electrodeposition offers higher paint utilization, outstanding corrosion protection and low environmental contamination. Initially, electrodeposition was conducted with the workpiece being coated serving as the anode. This was familiarly referred to as anionic electrodeposition. However, in 1972, cationic electrodeposition was introduced commercially. Since that time, cationic electrodeposition has steadily gained in popularity and today it is by far the most prevalent method of electrodeposition. Throughout the world, more than 80 percent of all motor vehicles produced are given a primer coating by cationic electrodeposition. Other areas of application are primer coating or one-coat topcoating of automobile accessories, farm machinery, house and electrical appliances, steel furniture and various structural components. The first cationic electrodepositable compositions used amine salt group-containing resins or onium salt group-containing resins as the binder, see, for example, U.S. Pat. No. 3,454,482 to Spoor et al and U.S. Pat. No. 3,839,252 to Bosso and Wismer. The curing agents for these resins were usually aminoplasts since these curing agents were used quite successfully with the earlier anionic electrodepositable resins. However, it was initially found that the aminoplasts were not completely satisfactory for use in cationic electrodeposition. Aminoplasts cure best in an acidic environment. With anionic electrodeposition, this poses no problem since the anionically electrodeposited coating is acidic. However, the cationically electrodeposited coating is basic and relatively high temperatures, that is, about 400° F. (204° C.) or higher must be used for complete curing of the cationically electrodeposited coating. There have been attempts to overcome this problem such as by trying to incorporate acid catalyst into the deposited film, but these measures have, in general, not been satisfactory.

It has now been found that a particularly structured aminoplast provides for low temperature curing. Surprisingly, it has been found that the low temperature curing ability of the aminoplast seems to be particular to onium group-containing resins, particularly quaternary ammonium group-containing resins. The aminoplast does not, for example, cure, at low temperature, amine salt group-containing resins which are deposited by cationic electrodeposition.

SUMMARY OF THE INVENTION

In accordance with the present invention, an improved curable, cationic coating composition is provided. The coating composition comprises an onium group-containing polymer, with quaternary ammonium group-containing polymers being preferred, and an aminoplast curing agent. The aminoplast has at least one group of the structure:

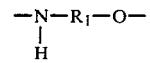

wherein $R_1$ is carbon derived from an aldehyde or a ketone. The aminoplast is present in the composition in an amount sufficient to cure the composition.

The invention also provides for the method of cationic electrodeposition employing the coating composition described above.

Prior Art

Besides the patents mentioned above, reference to the following patents and publications is made.

U.S. Pat. No. 3,663,389 discloses a process for cationic electrodeposition employing anionic and cationic resins in combination with an aminoplast curing agent. There is no disclosure in the reference of employing the particular aminoplast as claimed in the present invention.

U.S. Pat. No. 4,038,166 discloses cationic electrodeposition employing the quaternary ammonium salt group-containing resin in combination with an aminoplast curing agent. There is no disclosure in the reference of employing the particular aminoplast as claimed in the present invention.

Aminoplast resins such as those set forth in the claims of the present invention are commercially available material. For example, the materials are available from Monsanto Company under the trademark RESIMENE 717 and from American Cyanamid Company under the trademark CYMEL 325. Although the trade literature mentions that RESIMENE gives rapid low temperature crosslinking without the need for acid catalyst, there is no suggestion that these crosslinking agents could be used in cationic electrodeposition so as to provide low temperature cure. Many aminoplast resins are known to give low temperature cure. However, the ability of the aminoplast of the invention to give low temperature cure in an extremely basic environment of cationic electrodeposition is totally unexpected.

DETAILED DESCRIPTION

The aminoplast which is used in the practice of the present invention is a condensate of an amine or an amide with a stoichiometric deficiency of an aldehyde or a ketone to produce a reaction product containing at least one group, usually and preferably one pendant group of the structure:

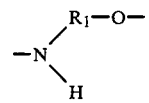

wherein $R_1$ is carbon derived from the aldehyde or ketone. Preferably, $R_1$ is derived from formaldehyde, i.e., $R_1$=—$CH_2$—. The condensate itself will have the general structure:

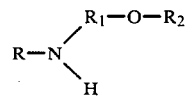

where $R_1$ is as described above and $R_2$ is hydrogen or alkyl including cycloalkyl and substituted alkyl. Preferably, $R_2$ is lower alkyl containing from 1 to 4 carbon atoms. R represents the remaining portion of the amine or the amide which has condensed with the aldehyde or ketone. Preferably, R itself contains one or more pendant groups of the structure:

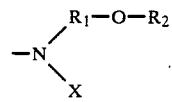

where $R_1$ and $R_2$ are as described above and X is hydrogen or $CH_2OR_2$.

With regard to the amines or amides which are used in making the aminoplast, melamine, urea or benzoguanamine are the most common and are preferred, and melamine is particularly preferred. Alkyl and aryl substituted derivatives of such compounds including alkyl and aryl substituted ureas and alkyl and aryl substituted melamines and benzoguanamines can be used. Examples of such compounds are N,N-dimethylurea, N-phenylurea, 6-methyl-2,4-diamino-1,3,5-triazine, 2,4,6-trimethyltriamine-1,3,5-triazine, and the like. Other amines and amides, for example, diazines, triazoles, guanidines, guanamines other than benzoguanamine, and acrylamides or polyamides can be used. Examples of such materials are dicyandiamide, formoguanamine, acetoguanamine, 3,5-diaminotriazole, triaminopyrimidine, acrylamide, methacrylamide, and copolymers of acrylamide and methacrylamide.

The amines or the amides described above are condensed with an aldehyde or ketone (including mixtures thereof) to produce the desired aminoplast. Among the aldehydes and ketones which can be used are formaldehyde, which is preferred, acetaldehyde, crotonaldehyde, acrolein, benzaldehyde, furfural and cyclohexanone.

The amines or amides are condensed with a stoichiometric deficiency of the aldehyde or ketone to obtain the desired products. Although aminoplasts which are prepared by reacting an amine or amide with stoichiometric amounts or greater of an aldehyde or ketone may have some small amount of the group

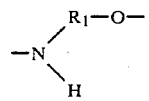

these groups are not present in significant amounts. In the present invention, it is preferred that at least 15 percent, more preferably at least 25 percent of the amine or amide group which are reacted with the aldehyde are of the structure:

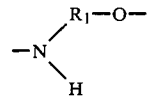

Usually, the aminoplasts also contain N-methylol groups or, as is more usual, N-alkoxymethyl groups in which at least a portion of the methylol groups are etherified by reaction with an alcohol. Any monohydric alcohol can be employed for this purpose, including alcohols such as methanol, ethanol, butanol and hexanol, as well as aromatic alcohols such as benzyl alcohol, cycloalkyl alcohols such as cyclohexanol, monoethers of glycols such as the monoalkyl ethers of ethylene glycol and diethylene glycol and halogen-substituted alcohols such as 3-chloropropanol. Preferably, the alcohol will be a lower alkyl alcohol containing from 1 to 4 carbon atoms.

The quaternary onium polymers can be prepared by techniques known in the art. For example, the quaternary ammonium-containing polymers can be prepared by reacting an epoxy-containing polymeric material with a tertiary amine in the presence of acid and/or water.

The epoxy-containing polymer is a resinous polyepoxide, that is, a polymeric resinous material containing two or more 1,2-epoxy groups per molecule. The preferred polyepoxides are polyglycidyl ethers of polyhydric phenols such as bisphenol A. These can be produced by etherification of a polyphenol with an epihalohydrin or dihalohydrin such as epichlorohydrin or dichlorohydrin in the presence of alkali. The polyhydric phenol can be, for example, bis-2,2-(4-hydroxyphenyl)propane, bis-1,1-(4-hydroxyphenyl)ethane, bis(2-hydroxynaphthyl)methane or the like.

Another quite useful class of polyepoxides are produced from novolak resins or similar polyhydroxyphenol resins.

Also suitable are similar polyglycidyl ethers of polyhydric alcohols such as ethylene glycol, propylene glycol, diethylene glycol and triethylene glycol.

There also can be used polyglycidyl esters of polycarboxylic acids which are produced by the reaction of epichlorohydrin or a similar epoxy compound with an aliphatic or aromatic polycarboxylic acid such as succinic acid and terephthalic acid.

The preferred epoxy-containing polymeric materials are polyglycidyl ethers of polyhydric phenols, particularly bisphenol A. The products are preferably further reacted to chain extend and increase their molecular weight. For example, they may be further reacted with active hydrogen-containing materials which are reactive with epoxy groups such as those containing —OH, —SH, and =NH groups. Chain extending of epoxy compounds is disclosed in U.S. Pat. Nos. 4,110,287; 4,148,772 and 4,260,720.

Besides the polyglycidyl ethers and esters mentioned above, other epoxy-containing polymers which may be employed are acrylic polymers which contain epoxy groups. These polymers are formed by polymerizing an unsaturated epoxy-containing monomer such as glycidyl acrylate or methacrylate with one or more other polymerizable ethylenically unsaturated monomers. Examples of other ethylenically unsaturated polymerizable epoxy group-containing monomers are allyl glycidyl ether and vinyl glycidyl phthalate.

Examples of other ethylenically unsaturated polymerizable monomers are those having at least one CH$_2$=CH< group. Examples of such monomers include vinyl acetate, methyl acrylate, ethyl acrylate, methyl methacrylate, acrylonitrile, styrene, 1,3-butadiene, vinyl chloride, hydroxyethyl acrylate or methacrylate and hydroxypropyl acrylate or methacrylate.

The epoxy-containing acrylic polymers are prepared by techniques well known in the art. The acrylic monomers are usually polymerized either in bulk or in solvent using a free radical producing catalyst such as peroxide-type catalyst or an azo compound. Examples of suitable catalysts are tertiary-butyl peroxide and 2,2'-azobisisobutyronitrile. Usually to control molecular weight, a chain transfer agent such as tertiary-dodecyl mercaptan is also employed.

The tertiary amine which is reacted with the epoxy-containing polymeric material may be unsubstituted or substituted with constituents such as hydroxyl, as long as the substituent does not interfere with the reaction of the amine and the epoxy-containing polymer and the substituents are of such a nature or employed under conditions such that they will not gel the reaction mixture. The preferred amines are tertiary amines and examples include dimethylethanolamine, triethylamine, trimethylamine, triisopropylamine and the like. Examples of other tertiary amines are disclosed in U.S. Pat. No. 3,839,252 to Bosso and Wismer in column 5, line 3, through column 7, line 42, the portions of which are herein incorporated by reference.

The tertiary amine and the epoxy-containing polymer are reacted by mixing the components in the presence of a sufficient amount of acid and/or water for the formation of quaternary ammonium groups. Reaction in the presence of acid results in the formation of quaternary ammonium salt groups. Reaction in the presence of water results in the formation of quaternary ammonium hydroxide groups. The resulting polymer can also contain mixed groups. It should be understood that by the expression "reacted in the presence of a sufficient amount of acid and/or water" is meant the reaction between the polyepoxide and the tertiary amine can be conducted neat or in the presence of organic solvent in the absence of acid and/or water and sufficient acid and/or water subsequently added after a period of reaction for the formation of quaternary ammonium groups. However, conducting the reaction with acid or water present from the beginning is preferred because it results in the formation of quaternary ammonium groups without significant molecular weight advancement of the material. Conducting the reaction in the absence of acid or water results in a molecular weight advancement of the epoxy.

Conducting the reaction in the presence of acid is preferred in certain circumstances when the quaternary ammonium group is to be used in electrodeposition. Aqueous dispersions of the resultant quaternary ammonium salt group-containing polymers electrodeposit as self-insulating films with greater rupture voltages and throwpower than comparable quaternary ammonium hydroxide-containing polymers which are obtained by reaction with water alone.

In conducting the reaction in the presence of acid, the tertiary amine can first be neutralized with acid to form the tertiary amine salt, followed by reaction with epoxy. Alternately, the epoxy-tertiary amine-containing polymer and acid can be reacted simultaneously or the amine and epoxy can be first reacted followed by acidification of the reaction product. Suitable acids are water-soluble organic acids such as acetic acid, lactic acid, phosphoric acid and the like.

The amount of water and/or acid which is used in the practice of the invention should be sufficient to result in the formation of quaternary ammonium base groups. Preferably, based on amine groups, the stoichiometric equivalent or excess of acid and/or water, that is, at least one mole of acid and/or water per mole of amine, is used. Even when conducting the reaction in the presence of acid, it is desirable to have water present so as to control the exothermic amine-epoxy reaction. Typically, about 1.0 to about 16 moles of water per equivalent of amine nitrogen is used.

In conducting the quaternization reaction, a co-solvent is not necessary, although one is often used in order to afford better control of reaction. Monoalkyl and monoaryl ethers of ethylene glycol are suitable co-solvents.

With regard to the amount of tertiary amine and epoxy-containing polymer which are reacted with one another, the relative amounts can be varied and depend on the extent of quaternization desired, and this in turn will depend on the molecular weight and structure of the epoxy-containing polymer. The extent of quaternization, the molecular weight and structure of the epoxy-containing polymer should be selected such that when the quaternary ammonium-containing polymer is mixed with an aqueous medium to form an electrodeposition bath, a stable dispersion will form. A stable dispersion is one which does not sediment or is one which is easily redispersible if some sedimentation occurs. In addition, the dispersion should be of sufficient cationic character that the dispersed resin particles will migrate towards the cathode when an electrical potential is impressed between an anode and a cathode immersed in the aqueous dispersion. Also, the molecular weight, structure and extent of salt formation should be controlled so that the dispersed resin will have the required flow to form a continuous film.

Besides tertiary amines, the desired quaternary ammonium-containing polymers can also be prepared with primary and secondary amines. This is accomplished by first reacting the polyepoxide with a primary and secondary amine. The resulting epoxy-amine reaction product is then reacted with additional epoxy which may be from some unreacted epoxy groups in the polyepoxide or from externally added epoxy such as propylene oxide, to convert the resulting reaction product to the quaternary ammonium group.

Besides quaternary onium group-containing polymers, other onium polymers can be used such as quaternary phosphonium group-containing polymers and ternary sulfonium group-containing polymers. Examples of these polymers and their method of preparation are found in U.S. Pat. No. 3,894,922, column 2, line 29, to column 10, line 41, and column 12, lines 24–48, and U.S. Pat. No. 3,959,106, column 2, line 34, to column 10, line 49, and column 12, lines 36–60, the portions of which are herein incorporated by reference.

The structure, molecular weight and degree of onium salt group formation are dependent on one another and the selection of one can only be made after a consideration of the other two. For example, because of flow considerations, the onium-containing polymers prepared from polyglycidyl ethers of polyphenols should be of lower molecular weight than many of the epoxy-containing acrylic polymers mentioned above. In addition, high molecular weight polymers usually require higher onium contents than lower molecular weight polymers unless the polymers contain hydrophilic groups such as polyoxyalkylene moieties.

In general, however, most of the onium-containing polymers useful in the practice of the invention have molecular weights within the range of 500 to 500,000 and contain from about 0.01 to 10 milliequivalents of onium base group per gram of resin solids. Obviously, one must use the skill of the art to couple the molecular weight with the onium base group content to arrive at a satisfactory polymer. With regard to onium-containing polymers prepared from the preferred polyglycidyl ethers of polyphenols, the molecular weight of the preferred polymers would be within the range of 500 to 10,000, preferably 1,000 to 5,000. These preferred polymers will contain from about 0.01 to 8.0, preferably 0.05 to 6.0 milliequivalents of onium base group per gram of polymer.

With regard to the amount of onium-containing polymer and aminoplast which are used in the practice of the invention, the aminoplast is usually present in the composition in amounts of at least 5 percent by weight based on total weight of the aminoplast and the onium-containing polymer. Preferably, the onium-containing polymer is present in amounts of about 90 to 40 percent by weight, and the aminoplast is present in amounts of about 10 to 60 percent by weight; the percentages by weight being based on total weight of onium-containing polymer and aminoplast.

For use in electrodeposition, the onium-containing polymer and the aminoplast are used in the form of an aqueous dispersion.

The term "dispersion" as used within the context of the present invention is believed to be a two-phase translucent or opaque aqueous resinous system in which the resin is the dispersed phase and the water the continuous phase. The average particle size diameter of the resinous phase is generally less than 10 and preferably less than 5 microns. The term "dispersion" is also intended to cover homogeneous aqueous solutions which appear optically clear.

The concentration of the resinous products in the aqueous medium depends on the process parameters to be used and, in general, is not critical but ordinarily the major portion of the aqueous dispersion is water, for example, the aqueous dispersion may contain from 5 to 50 percent by weight resin solids.

Besides water, the aqueous medium may contain a coalescing solvent. The use of coalescing solvents provides, in some instances, for improved deposited film appearance. These solvents include hydrocarbons, alcohols, esters, ethers and ketones. The preferred coalescing solvents include monoalcohols, glycols and polyols as well as ketones and other alcohols. Specific coalescing solvents include butanol, 2-ethylhexanol, capryl alcohol, isophorone, 4-methoxymethyl-2-pentanone, and the monoethyl, monobutyl, monohexyl and monophenyl ethers of ethylene glycol and propylene glycol. The amount of coalescing solvent is not unduly critical and is generally between about 0.1 and 40 percent by weight, preferably about 0.5 to about 25 percent by weight, based on total weight of the aqueous medium.

In most instances, a pigment composition and, if desired, various additives such as surfactants or wetting agents are included in the dispersion. The pigment compositions may be of the conventional type comprising, for example, an organic pigment such as iron oxide, lead oxide, strontium chromate, carbon black, coal dust, titanium dioxide, talc, barium sulfate as well as color pigments such as cadmium yellow, cadmium red, chromium yellow, and the like. Organic pigments such as phthalocyanine blue and green and ultramarine blue may also be used and mixtures of pigments may be used. The pigment content of the dispersion is usually expressed as pigment-to-resin ratio. In the practice of the present invention, pigment-to-resin ratios within the range of 0.01 to 5:1 are usually used. The other additives mentioned above are present in the dispersion in amounts of at least 0.01, usually 0.01 to 25 percent by weight, based on total weight of resin solids. Preferably, the dispersion contains about 0.01 to 5 percent by weight based on total weight of resin solids of boric acid or a compound which forms boric acid in aqueous medium.

In the electrodeposition process employing the aqueous dispersions described above, the aqueous dispersion is placed in contact with an electrically conductive anode and an electrically conductive cathode with the surface to be coated being the cathode. While in contact with the aqueous dispersion, an adherent film of the coating composition is deposited on the electrode when a voltage is impressed between the electrodes. The conditions under which electrodeposition is carried out are, in general, similar to those used in electrodeposition of other types of coatings. The applied voltage may be varied greatly and can be, for example, as low as one volt to as high as several thousand volts, but typically is between about 50 and 500 volts. The current density is usually between 1.0 ampere and 15 amperes per square foot and tends to decrease during electrodeposition indicating the formation of a self-insulating film.

Besides electrodeposition, the coating compositions can be applied by non-electrophoretic techniques such as dip, roll or spray coating.

After the coating has been applied, it is cured. The coating compositions of the present invention, particularly the quaternary ammonium group-containing polymers, have ability to be cured at low temperature, that is, to be cured at a temperature of 350° F. (177° C.) or less, preferably 325° F. (163° C.) or less, more preferably 300° F. (149° C.) or less, most preferably 250° F. (121° C.) or less, after an exposure of from 1 to 60, usually 20 to 45 minutes. However, higher temperatures can be used if for some reason they are desired. The cure of the applied coating is determined by its resistance to acetone. Films are considered cured when at a dry film thickness of about 0.3 to 2.0 mils (7.5 to 50 microns), the film will withstand 50 double rubs with an acetone-saturated cloth without rubbing through to the substrate. A double rub is a rub back and forth over the same area using normal hand pressure estimated to be about 20 Newtons.

Illustrating the invention are the following examples, which, however, are not to be construed as limiting the invention to their details. All parts and percentages in the examples, as well as thoughout the specification, are by weight unless otherwise specified.

EXAMPLES

The following examples describe cationic electrodepositable coating compositions comprising various quaternary ammonium salt group-containing polymers and amine salt group-containing polymers in combination with various aminoplast curing agents, some of which contain

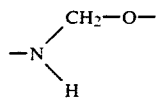

groups and some of which do not. For the purposes of control, a composition without any aminoplast was also evaluated. The compositions were cathodically electrodeposited onto electroconductive substrates and evaluated for cure at low temperatures.

EXAMPLEs I-V

A quaternary ammonium salt group-containing resin was prepared from the following ingredients:

| Ingredients | Solids in grams | Equivalents | Grams |
|---|---|---|---|
| EPON 829[1] | 722.1 | 3.84 | 748.3 |
| Bisphenol A | 266.9 | 2.34 | 266.9 |
| Xylene | | | 7.8 |
| 5,5-Dimethylhydantoin | 47.2 | 0.733 | 47.2 |
| Capryl alcohol | | | 54.4 |
| Ethyltriphenylphosphonium iodide | 1.3 | | 13.3 |
| 2-Ethylhexanol | | | 115.0 |
| Dimethylethanolamine lactate[2] | 56.1 | 0.307 | 74.8 |
| Dimethyldodecylamine | 16.8 | 0.077 | 16.8 |
| GEIGY AMINE C[3] | 7.4 | 0.0283 | 7.4 |
| SURFYNOL 104-A[4] | 7.4 | | 14.8 |
| Deionized water | | 5.31 | 95.6 |

[1]Epoxy resin solution available from Shell Chemical Company formed from reacting epichlorohydrin and bisphenol A having an epoxy equivalent of about 194.
[2]Salt obtained by neutralizing dimethylethanolamine with 88 percent by weight aqueous lactic acid.
[3]Alkyl imidazoline, available from Geigy Industrial Chemicals.
[4]Acetylenic alcohol, available from Air Products & Chemicals, Inc.

The EPON 829, bisphenol A and xylene were charged to a reaction vessel and heated with a nitrogen sparge to 152° C. to initiate an exotherm with a peak temperature of 200° C. The reaction mixture was held at 160°-170° C. for about 1 hour. The reaction mixture was cooled to about 158° C., followed by the addition of the 5,5-dimethylhydantoin, capryl alcohol and ethyltriphenylphosphonium iodide catalyst. The reaction mixture was then heated to 175° C. and held for two hours at 175°-185° C., followed by thinning with the 2-ethylhexanol and cooling to 100° C. The dimethylethanolamine lactate, dimethyldodecylamine, GEIGY AMINE C, SURFYNOL 104-A and deionized water were then added and the reaction mixture held at a temperature of 85°-95° C. for 2 hours followed by cooling to room temperature.

Five hundred (500) grams of the reaction mixture were charged to another reaction vessel and blended under a nitrogen atmosphere with agitation and heating (60° C.) with 196.2 grams (164.8 grams resin solids) of the aminoplast RESIMENE 717 available from Monsanto Company (30 percent by weight aminoplast based on weight of aminoplast and quaternary ammonium polymer).

Six hundred eighty-two (682.3) grams of the mixture (538.5 grams resin solids) was then dispersed with 1471.7 grams of deionized water to form a 25 percent resin solids aqueous dispersion having a pH of 7.9.

For comparative purposes, resinous dispersions as generally described above were prepared in which the RESIMENE 717 was replaced by RESIMENE 741, RESIMENE 753 and CYMEL 325. The RESIMENE 741 and 753 were aminoplasts which do not contain significant amounts of the desired groups and were believed to have the following pendant groups:

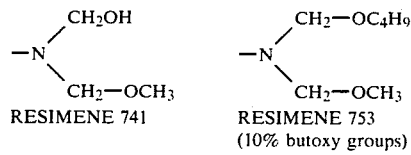

CYMEL 325 is believed to be similar to RESIMENE 717 but available from another manufacturer (American Cyanamid Company).

For the purpose of control, a dispersion without aminoplast crosslinker was also prepared.

The five dispersions prepared as described above were thinned with deionized water to form 10-12.5 percent resin solids dispersions. Steel panels were cathodically electrodeposited in these dispersions to produce continuous films for Examples I to IV of about 0.3 to 2 mils (7.5 to 50 microns) thickness. Example V had a much thicker film thickness of about 5 mils (127 microns). The coated substrates were heated at various temperatures to cure the coatings as reported in Table I below.

TABLE I

Heating Schedules and Extent of Cure of Examples I-V

| Example No. | Aminoplast | Cure Schedule Minutes/Temp. °F. (°C.) | Extent of Cure |
|---|---|---|---|
| I | RESIMENE 717 | 30/200° F. (93° C.) | Complete cure[1] |
| I | RESIMENE 717 | 30/150° F. (66° C.) | No cure |
| II | RESIMENE 741 | 30/350° F. (177° C.) | No cure |
| III | RESIMENE 753 | 30/250° F. (121° C.) | No cure |
| III | RESIMENE 753 | 30/350° F. (177° C.) | No cure |
| IV | CYMEL 325 | 30/250° F. (121° C.) | Complete cure[1] |
| V | none (control) | 30/350° F. (177° C.) | No cure |

[1]In Examples I and IV, complete cure was evidenced in that 100 double rubs with an acetone-saturated cloth did not remove the films from the substrates and barely affected the appearance of the films. In the examples evidencing no cure, the coating was completely removed from the substrate with a few double rubs. In Example V, 30 double rubs were required but this was believed to be due to the thickness of the film and not the degree of cure.

The results presented in Table I show an aminoplast containing the desired

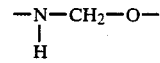

groups cures the quaternary ammonium polymer completely at low temperatures, whereas aminoplasts without the desired groups and the control exhibit no cure at even higher temperatures.

EXAMPLE VI

In the following example, a tertiary amine salt group-containing resin was prepared similar to that used in Examples I-IV, but prepared by reacting a polyglycidyl ether of bisphenol A with a secondary amine. The resultant resin was neutralized with acid, combined with about 30 percent by weight of an aminoplast crosslinking agent (RESIMENE 717), and dispersed in deionized water to form a 10 percent resin solids dispersion having a pH of 6.8. When zinc phosphate-pretreated steel panels were cathodically electrodeposited in the bath at 275 volts for 2 minutes, a clear film having at thickness of 0.6 mil was obtained. The film evidenced no cure when heated for 30 minutes at 350° F. (177° C.).

We claim:

1. An improved, curable cationic coating composition comprising an onium group-containing polymer and an aminoplast curing agent, characterized in that the aminoplast curing agent has at least one group of the structure:

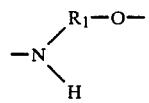

wherein $R_1$ is carbon derived from an aldehyde or ketone and the aminoplast is present in amounts sufficient to cure the composition.

2. The coating composition of claim 1 in which the onium group-containing polymer is a quaternary ammonium group-containing polymer.

3. The coating composition of claim 1 wherein $R_1$ is derived from an aldehyde.

4. The coating composition of claim 3 wherein the aldehyde is formaldehyde.

5. The coating composition of claim 1 in which the aminoplast is a condensate of melamine and formaldehyde.

6. The coating composition of claim 5 in which the aminoplast condensate is at least partially etherified with an alcohol.

7. The coating composition of claim 6 in which the alcohol contains from 1 to 4 carbon atoms.

8. The coating composition of claim 1 in which the aminoplast is present in the composition in amounts of at least 5 percent by weight based on total weight of the onium group-containing polymer and aminoplast.

9. The coating composition of claim 8 in which the aminoplast is present in the composition in amounts of about 10 to 60 percent by weight.

10. The coating composition of claim 1 which contains boric acid.

11. An improved curable cationic coating composition comprising a quaternary ammonium group-containing polymer and an aminoplast curing agent, characterized in that the aminoplast curing agent has at least one group of the structure:

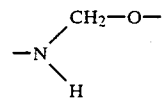

and the aminoplast is present in amounts sufficient to cure the composition.

12. The coating composition of claim 11 in which the aminoplast is a condensate of melamine and formaldehyde.

13. The coating composition of claim 11 in which the aminoplast is present in the composition in amounts of about 10 to 60 percent by weight based on total weight of quaternary ammonium group-containing polymer and aminoplast.

14. An improved, curable cationic coating composition comprising an onium group-containing polymer and an aminoplast curing agent formed from reacting an amine or an amide with an aldehyde or a ketone, characterized in that at least 15 percent by weight of the aminoplast curing agent has at least one group of the structure:

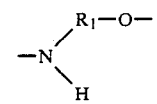

wherein $R_1$ is carbon derived from an aldehyde or ketone and the aminoplast is present in amounts sufficient to cure the composition.

15. An improved curable cationic coating composition comprising a quaternary ammonium group-containing polymer and an aminoplast curing agent formed from reacting an amine or an amide with an aldehyde or a ketone, characterized in that at least 15 percent by weight of the aminoplast curing agent has at least one group of the structure:

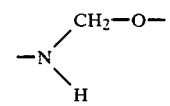

and the aminoplast is present in amounts sufficient to cure the composition.

16. An improved curable cationic coating composition comprising a quaternary ammonium group-containing polymer and an aminoplast curing agent which is formed from reacting melamine with formaldehyde, characterized in that at least 15 percent by weight of the aminoplast curing agent has at least one group of the structure:

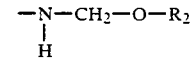

wherein $R_2$ is hydrogen or lower alkyl containing from 1 to 4 carbon atoms and the aminoplast is present in the composition in amounts of about 10 to 60 percent by weight based on weight of quaternary ammonium group-containing polymer and aminoplast.

* * * * *